Figure 1:
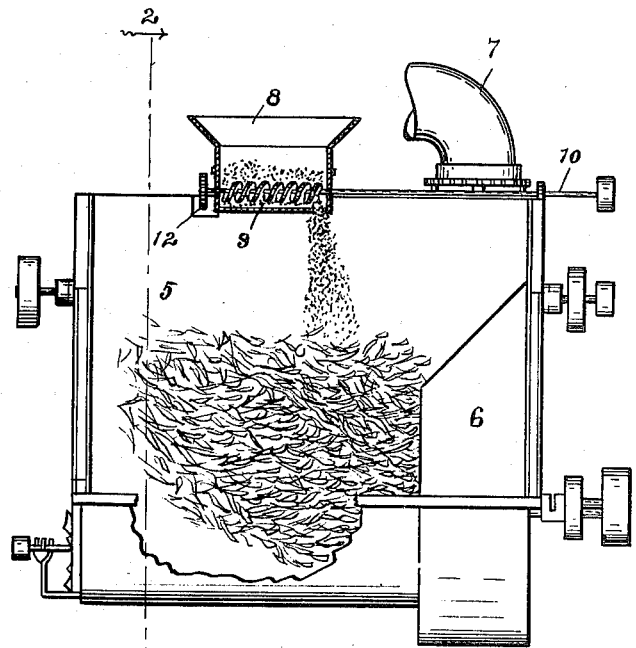

J. K. SHARPE, Jr.
PROCESS OF PRESERVING FODDER.
APPLICATION FILED DEC. 28, 1908.

1,013,568.

Patented Jan. 2, 1912.

Witnesses:
Adelaide Kearns
Lee R. Garber

Inventor
Joseph K. Sharpe, Jr.
By James A. Walsh,
Attorney.

UNITED STATES PATENT OFFICE.

JOSEPH K. SHARPE, JR., OF INDIANAPOLIS, INDIANA.

PROCESS OF PRESERVING FODDER.

1,013,568.      Specification of Letters Patent.      Patented Jan. 2, 1912.

Application filed December 28, 1908. Serial No. 469,622.

*To all whom it may concern:*

Be it known that I, JOSEPH K. SHARPE, Jr., a citizen of the United States, residing at Indianapolis, in the county of Marion and State of Indiana, have invented new and useful Improvements in Processes of Preserving Fodder, of which the following is a specification.

Corn stalks and leaves, when properly shredded, make an excellent fodder for cattle, and it is a growing practice to haul such material from the field and run it through what is known as a corn husker and shredder, which removes the ears of corn from the stalks, and shreds the stalks and leaves, which shredded material is withdrawn from the machine by pneumatic stackers, or other means, and discharged into a mow, barn, or other inclosure. As this shredding is performed during the fall and winter months, after the corn crop has weathered and been cured, the material is usually in damp condition, and when shredded and stored in large quantities often becomes heated and moldy, in which state it is unpalatable and therefore unfit for fodder, and, rapidly developing into a heated mass, becomes dangerous because of fire from spontaneous combustion, when with great difficulty if at all it must be promptly removed from the storehouse, and becomes a total loss. As such fodder is shredded or otherwise treated by machinery it is handled very rapidly and in large quantities, and in the case of corn the shocks are fed to the machine and shredded at the rate of about one shock per minute. The shredded material issues from the shredding apparatus in continuous and heavy masses, and with a pneumatic stacker is withdrawn therefrom and violently blown into an inclosure where it is stored in comparatively loose condition.

While I have particularly referred to a pneumatic stacker, it will be understood, of course, that other types of conveyers are employed for delivering material from shredding and like machines.

Common salt mixed with corn fodder, clover hay, and the like, acts not only as a preservative therefor, but enriches the fodder and renders it much more palatable, and greatly desired by cattle and horses. In order to preserve and enrich large quantities of such material under the conditions stated, I treat the same with salt or other preservative by directing a stream thereof in a manner as to cause it to mingle with the shredded material while being discharged and before it is deposited in an inclosure by a conveyer, so that as the material is being deposited in a storehouse it is so laden with the preservative as to insure that there will be a thorough mixing of the preservative therewith.

Figure 2:
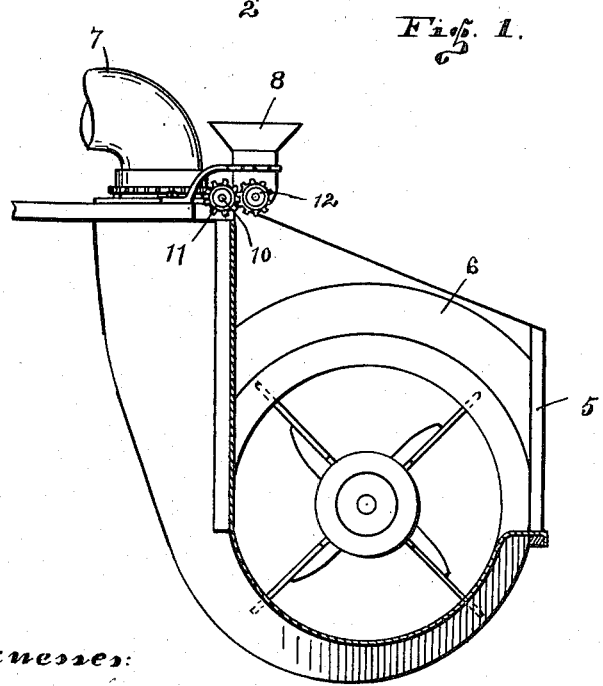

As illustrating a manner by which my preserving process may be carried out, I have, in the accompanying drawing, which is made a part hereof, shown a pneumatic stacker, Figure 1 being an elevation of such an apparatus designed to be attached to or form a part of a corn husker and shredder, clover huller, or like machine, and provided with means for feeding salt or other preservative to shredded or separated material, and Fig. 2 is a transverse sectional view on the dotted line 2—2 in Fig. 1.

In said drawings the portions marked 5 represent the material receiving chamber of a pneumatic stacker, and 6 a stacker fan which withdraws material which has been treated by the shredding machine and discharges the same in a storehouse through the stacker pipe 7. During the operation of shredding corn fodder, (or separating other products), and depositing it in an inclosure I introduce a stream of salt or other preservative into the stacker chamber, or at the mouth of the stacker pipe, or at any other appropriate location, and cause the same to constantly or intermittently flow into the shredded or separated material, which, thus treated, is thoroughly mixed as it is being deposited and loosely stored. As an example of means for accomplishing this salting or preserving process I have shown a hopper, as 8, for containing the preservative, as plainly indicated in Fig. 1, from which the salt may flow by gravity, or be fed therefrom by a spiral conveyer 9 or otherwise, in which latter case the conveyer may communicate with and be operated by the shaft 10 ordinarily provided for automatically swinging the stacker pipe, and these elements, as indicated, may be connected by gears, as 11 and 12. As hereinbefore indicated, however, my process consists in introducing a supply of salt or other preservative into shredded or material otherwise treated while the same is being rapidly received and discharged from the machine, so that as it is deposited in a storehouse it is plentifully supplied with the preservative, and the fodder thus enriched and rendered highly palatable, and kept in preserved condition.

I claim:

The herein described method of preserving comminuted fodder, which consists in introducing a preservative material into and mixing it with the stream of fodder after the same has been shredded by and is being discharged from a shredding machine and while being conveyed therefrom and loosely stored.

JOSEPH K. SHARPE, Jr.

Witnesses:
HOMER R. BARKER,
WALTER J. TINGLE.